US011643031B2

(12) United States Patent
Brown

(10) Patent No.: US 11,643,031 B2
(45) Date of Patent: May 9, 2023

(54) ALLERGEN MAP CREATED BY VEHICLE NETWORK

(71) Applicant: Toyota Motor North America, Inc., Plano, TX (US)

(72) Inventor: Tyler Brown, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 196 days.

(21) Appl. No.: 16/509,432

(22) Filed: Jul. 11, 2019

(65) Prior Publication Data
US 2021/0009055 A1 Jan. 14, 2021

(51) Int. Cl.
*B60R 16/023* (2006.01)
*B60W 50/14* (2020.01)
(Continued)

(52) U.S. Cl.
CPC ....... *B60R 16/0237* (2013.01); *B60H 3/0608* (2013.01); *B60W 50/14* (2013.01);
(Continued)

(58) Field of Classification Search
CPC .... B60R 16/0237; E05F 15/70; E05F 15/695; E05F 15/71; B60W 50/14; B60W 2555/20; B60W 2556/45; B60W 2050/143; B60W 2050/146; B60W 2540/221; B60W 2556/50; G07C 5/008; G07C 5/08; G07C 5/0866; B60H 3/0608; B60H 2003/0683; B60H 1/008; B60H 1/00771; B60K 2370/592; B60K 35/00; E05Y 2400/42; E05Y 2900/55
See application file for complete search history.

(56) References Cited

U.S. PATENT DOCUMENTS 6,206,775 B1 3/2001 Lemaitre et al.
7,803,039 B2 9/2010 Inoue et al.
(Continued)

FOREIGN PATENT DOCUMENTS

DE 102014223774 5/2016
JP 2009223514 A * 10/2009 ............. B60H 1/008

OTHER PUBLICATIONS

Machine Translation of JP 2009223514 A (Year: 2009).*

*Primary Examiner* — James J Lee
*Assistant Examiner* — Alexander George Matta
(74) *Attorney, Agent, or Firm* — Snell & Wilmer LLP

(57) ABSTRACT

A system for providing allergen information includes an allergen sensor located on a vehicle designed to detect allergen data corresponding to levels of at least one allergen in an environment of the vehicle. The system further includes a network access device located on the vehicle and designed to transmit the allergen data to a remote server and to receive an allergen map from the remote server, the allergen map being based on the allergen data from the vehicle and from additional vehicles, and indicating the levels of the at least one allergen at various locations on the allergen map. The system further includes an output device designed to output data. The system further includes an electronic control unit (ECU) coupled to the allergen sensor, the network access device, and the output device and designed to control the output device to output the allergen map received from the remote server.

12 Claims, 8 Drawing Sheets

(51) Int. Cl.
*B60H 3/06* (2006.01)
*E05F 15/70* (2015.01)
*G07C 5/00* (2006.01)

(52) U.S. Cl.
CPC .............. *E05F 15/70* (2015.01); *G07C 5/008* (2013.01); *B60H 2003/0683* (2013.01); *B60W 2555/20* (2020.02); *B60W 2556/45* (2020.02)

(56) References Cited

U.S. PATENT DOCUMENTS

| | | | |
|---|---|---|---|
| 8,145,383 B2 | 3/2012 | Prokhorov | |
| 8,378,843 B2 | 2/2013 | MacKenzie et al. | |
| 9,042,824 B2 | 5/2015 | Prasad et al. | |
| 9,429,442 B2 | 8/2016 | Kamada et al. | |
| 9,449,514 B2 | 9/2016 | Schunder et al. | |
| 9,688,194 B2 | 6/2017 | MacNeille et al. | |
| 10,220,676 B2 | 3/2019 | Kulthe | |
| 10,226,982 B2 | 3/2019 | Alger et al. | |
| 2010/0073363 A1* | 3/2010 | Densham | G06K 9/00624 345/419 |
| 2012/0112915 A1* | 5/2012 | Strumolo | G16H 20/10 340/573.1 |
| 2012/0286959 A1* | 11/2012 | Ray | G08B 21/043 340/627 |
| 2014/0303885 A1* | 10/2014 | Kamada | G01C 21/3461 701/400 |
| 2015/0298903 A1 | 10/2015 | Luxford | |
| 2016/0280160 A1* | 9/2016 | MacNeille | G05B 15/02 |
| 2016/0347327 A1* | 12/2016 | Kondo | B60W 50/082 |
| 2018/0203159 A1 | 7/2018 | Lambert et al. | |
| 2018/0266933 A1* | 9/2018 | Tamraz | G01N 15/06 |
| 2018/0326811 A1 | 11/2018 | Chelian et al. | |
| 2019/0014093 A1* | 1/2019 | Wang | H04L 9/0662 |
| 2019/0382001 A1* | 12/2019 | Chelian | G08G 1/147 |
| 2020/0346511 A1* | 11/2020 | Hasegawa | B60H 1/00849 |

\* cited by examiner

ALLERGEN MAP CREATED BY VEHICLE NETWORK

BACKGROUND

1. Field

The present disclosure relates to systems and methods for determining allergen information by a vehicle network and for providing the allergen information to a vehicle user, such as by providing an allergen map.

2. Description of the Related Art

As technology advances, devices are capable of more and more functions. Sensors, in particular, are increasing not only in accuracy but also in the types of data that they can detect. Over time, sensors have been developed to detect the presence of relatively small particles (e.g., on the order of micrometers). These sensors are also being designed to identify types of particles. Now, sensors are commercially available that can detect the presence, and density or quantity, of specific particles such as pollens. These sensors can even detect the type of particle that is present (such as maple tree pollen).

At the same time, vehicles are becoming ubiquitous throughout the world. These vehicles are transporting people and things to more and further locations all the time. In that regard, sensors located on vehicles can detect data over a wide swath of earth. However, vehicles are not currently equipped with sensors to detect certain information such as the presence of allergens. Additionally, no system is in place to aggregate and analyze data detected by vehicles.

Thus, there is a need in the art for systems and methods for accurate detection and aggregation of allergen data by vehicle or other mobile sensors.

SUMMARY

Described herein is a system for providing allergen information. The system includes an allergen sensor located on a vehicle and designed to detect allergen data corresponding to levels of at least one allergen in an environment of the vehicle. The system further includes a network access device located on the vehicle and designed to transmit the allergen data to a remote server and to receive an allergen map from the remote server, the allergen map being based on the allergen data from the vehicle and from additional vehicles, and indicating the levels of the at least one allergen at various locations on the allergen map. The system further includes an output device designed to output data. The system further includes an electronic control unit (ECU) coupled to the allergen sensor, the network access device, and the output device and designed to control the output device to output the allergen map received from the remote server.

Also described is a system for providing allergen information. The system includes a network access device designed to receive allergen data corresponding to levels of at least one allergen and associated locations, the allergen data being received from multiple vehicles each having an allergen sensor. The system also includes a memory designed to store a map of an area. The system also includes a processor coupled to the network access device and the memory and designed to aggregate the allergen data to create an allergen map indicating levels of the at least one allergen at various locations on the map, and to transmit the allergen map to at least one of the multiple vehicles.

Also disclosed is a method for providing allergen information. The method includes detecting, by an allergen sensor, allergen data corresponding to levels of at least one allergen in an environment of a vehicle. The method also includes transmitting, by a network access device located on the vehicle, the allergen data to a remote server. The method also includes receiving, by the network access device, an allergen map from the remote server, the allergen map being based on the allergen data from the vehicle and from additional vehicles, and indicating the levels of the at least one allergen at various locations on the allergen map. The method also includes controlling, by an electronic control unit (ECU) of the vehicle, an output device to output the allergen map received from the remote server.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for aggregating allergen information from sensors of multiple vehicles. The systems provide several benefits and advantages such as aggregating allergen data over a relatively large region due to the abundance of vehicles. The systems provide additional benefits and advantages such as aggregating the allergen data to determine trends and predict future allergen levels. The systems also advantageously associate allergen levels with specific locations and warn individuals if they are entering an area with relatively high levels of allergens to which they are allergic. The systems can beneficially take an action if a user is entering an area with high allergens such as automatically rolling up the windows to reduce allergen exposure or re-routing the vehicle along a route that avoids areas with relatively high allergens.

An exemplary system includes multiple vehicles that each include an allergen sensor capable of detecting allergen data. The system further includes a central server that has a memory to store allergen information from the vehicles. The server also includes a processor to aggregate and analyze the data. The processor can also learn allergen trends by analyzing past allergen data and can use the learned trends to predict future allergen levels. The processor can generate an allergen map that includes allergen levels at various locations, and the server can transmit the allergen map to the various vehicles. The vehicles may also include output devices to output the allergen levels, along with ECUs that may control various aspects of the vehicles based on the allergen levels.

Figure 1:
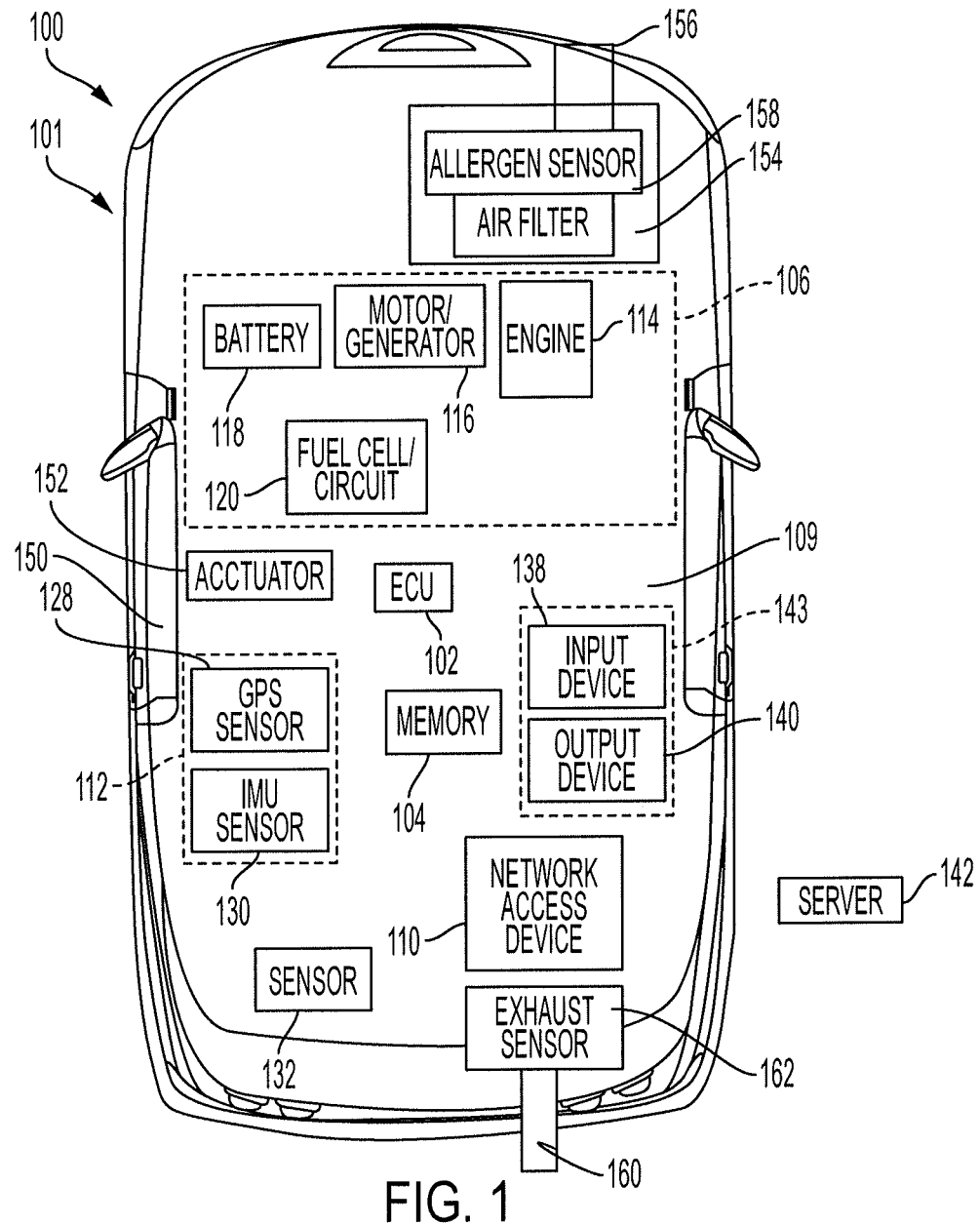
FIG. 1 is a block diagram illustrating a system and a vehicle for providing allergen information to be used in generating an allergen map according to an embodiment of the present invention.

Turning to FIG. 1, a vehicle 100 may include a system 101 for providing allergy information to a user of the vehicle 100. The vehicle 100 (or system 101) may include an ECU 102, a memory 104, a power source 106, and a main body 108. The vehicle 100 (or system 101) may further include a network access device 110, and a sensor 132. The vehicle may also include a multimedia unit 143 including an input device 138 and an output device 140. The vehicle 100 may also include an air filter 154 that receives air via an air intake channel 156, and an allergen sensor 158 located in or on at least one of the air filter 154 or the air intake channel 156. The vehicle 100 may further include an exhaust channel 160 and an exhaust sensor 162 located in or on the exhaust channel 160. The allergen sensor 158 and the exhaust sensor 162 may be located at any other location on the vehicle 100 without departing from the scope of the present disclosure.

The main body 108 may be propelled along a roadway, may be suspended in or on water, or may fly through air. The main body 108 may resemble a vehicle such as a car, a bus, a motorcycle, a boat, an aircraft, or the like. The main body 108 may further support one or more individual such as a driver, a passenger, or the like. The main body 108 may define a vehicle cabin 109. A window 150 may be actuated between an open position (in which air may flow freely from an environment of the vehicle 100 into the vehicle cabin 109) and a closed position (in which airflow from the environment into the vehicle cabin 109 is restricted). A window actuator 152 may actuate the window 150 between the open position and the closed position.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such autonomous functionality.

The memory 104 may include any non-transitory memory and may store data usable by the ECU 102. For example, the memory 104 may store map data, may store allergen data (such as detected by the allergen sensor 158 or received by the network access device 110), may store instructions usable by the ECU 102 to drive autonomously, or the like.

The power source 106 may include any one or more of an engine 114, a motor-generator 116, a battery 118, or a fuel cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage device including a battery, a flywheel, a super capacitor, a thermal storage device, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be -party se The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The sensor 132 may include one or more of the location sensor 112, a radar sensor 122, a lidar sensor 124, a camera 126, a sensor capable of detecting a status of a vehicle component, a sensor capable of detecting environmental conditions (including weather), another allergen sensor, or the like. As additional examples, the sensor 132 may include one or more of a grade sensor designed to detect a grade of a current roadway, an altimeter designed to detect an altitude of the vehicle 100, a speed sensor (such as an angular velocity sensor coupled to one or more wheel) designed to detect a speed of the vehicle 100, or the like. The sensor 132 may also or instead include one or more of a voltage sensor, a current sensor, a temperature sensor, a pressure sensor, a fuel gauge, an airflow sensor, an oxygen sensor, or the like.

The air filter 154 may receive air from the air intake channel 156 and may filter the air prior to the air being ported to the vehicle cabin 109. For example, the air filter 154 may remove particles from the air prior to the air reaching the vehicle cabin 109.

The exhaust channel 160 may port exhaust generated by the engine (or from another vehicle component) into an environment of the vehicle.

The allergen sensor 158 may be located in, on, or in relatively close proximity (e.g., within 1 foot, within 2 feet, within 5 feet, or the like) to the air filter 154 or the air intake channel 156. In some embodiments, the allergen sensor 158 may be located on another portion of the vehicle 100 in a location in which it may be exposed to air in the environment of the vehicle 100.

The allergen sensor 158 may detect allergen data corresponding to presence of allergens in an environment of the vehicle 100. The allergen sensor 158 may include one or more allergen sensor capable of detecting allergens such as pollen, other organic particles, exhaust or other man-made allergens, animal excrement or dander, or any other particle to which individuals may be allergic. The allergen sensor 158 may be capable of detecting levels, such as relative levels, of allergens in the environment. In some embodiments, the allergen sensor 158 may detect levels of multiple different types of allergens and may distinguish between the different types. For example, the allergen sensor 158 may detect that maple tree pollen is at a level 7 out of 10 and that grass pollen is at a level 2 out of 10. In some embodiments, the allergen sensor 158 may detect the levels of allergens in various ways such as an absolute particle count of the allergens per unit volume (e.g., 50 particles per cubic foot), a mass flow of the allergens, a percentage of air that contains the allergens, or the like.

The exhaust sensor 162 may detect exhaust data corresponding to levels of allergens being released from components of the vehicle 100 into the environment. For example, the exhaust sensor 162 may detect levels of allergens, such as various pollutants, being released from the vehicle 100. As with the allergen sensor 158, the exhaust sensor 162 may detect the levels of multiple different types of allergens and may be capable of distinguishing between the multiple types.

One or both of the allergen sensor 158 or the exhaust sensor 162 may also detect air quality in the vicinity of the vehicle 100. The air quality may correspond to levels of pollutants (including allergens and non-allergen pollution) in the environment, whether generated by the vehicle 100, by other vehicles, or from other sources, or may include any other air quality measurement. Where used throughout, allergen data may include this allergen and non-allergen air quality data. The one or more allergen sensors 158 may also be referred to as air quality sensors 158. The one or more air quality sensors 158 may be able to detect and/or measure the different types and amounts of air pollutants such as lead, nitrogen oxide, ozone, particulate matter, carbon dioxide, and sulfur dioxides. These air pollutants can be in the form of solids, liquids, or gases.

The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wired or wireless protocol. The network access device 110 may be referred to as a data communication module (DCM) and may communicate with any device on the vehicle 100 and/or any remote device.

The network access device 110 may communicate with a remote server 142 (such as a cloud server or other central server). The remote server 142 may receive allergen data and exhaust data from the vehicle 100. The remote server 142 may aggregate the allergen data to generate an allergen map or other data structure that maps levels of different allergens to various locations. The remote server 142 may further transmit the allergen map or other data structure back to the vehicle 100.

The ECU 102 may perform various actions based on the detected allergen levels or the allergen map received from the central server 142. For example, the ECU 102 may control the window actuator 152 to close the window 150 if a level of a certain allergen (e.g., as indicated by a user) reaches or exceeds a threshold allergen level. The ECU 102 may further determine a destination of a vehicle user and may determine a route to the destination that avoids areas with allergen levels greater than or equal to a threshold allergen level.

The input device 138 may include any one or more input device such as a button, a keyboard, a mouse, a touchscreen, a microphone, or the like. The input device 138 may receive input from a user of the vehicle 100 such as a driver or a passenger.

The output device 140 may include any output device such as a speaker, a display, a touchscreen, or the like. The output device 140 may output data to a user of the vehicle such as the pollen map received from the remote server 142. The output device 140 may also or instead output a warning or alert if pollen levels in the vicinity of the vehicle 100 reach or exceed a threshold pollen level.

Figure 2:
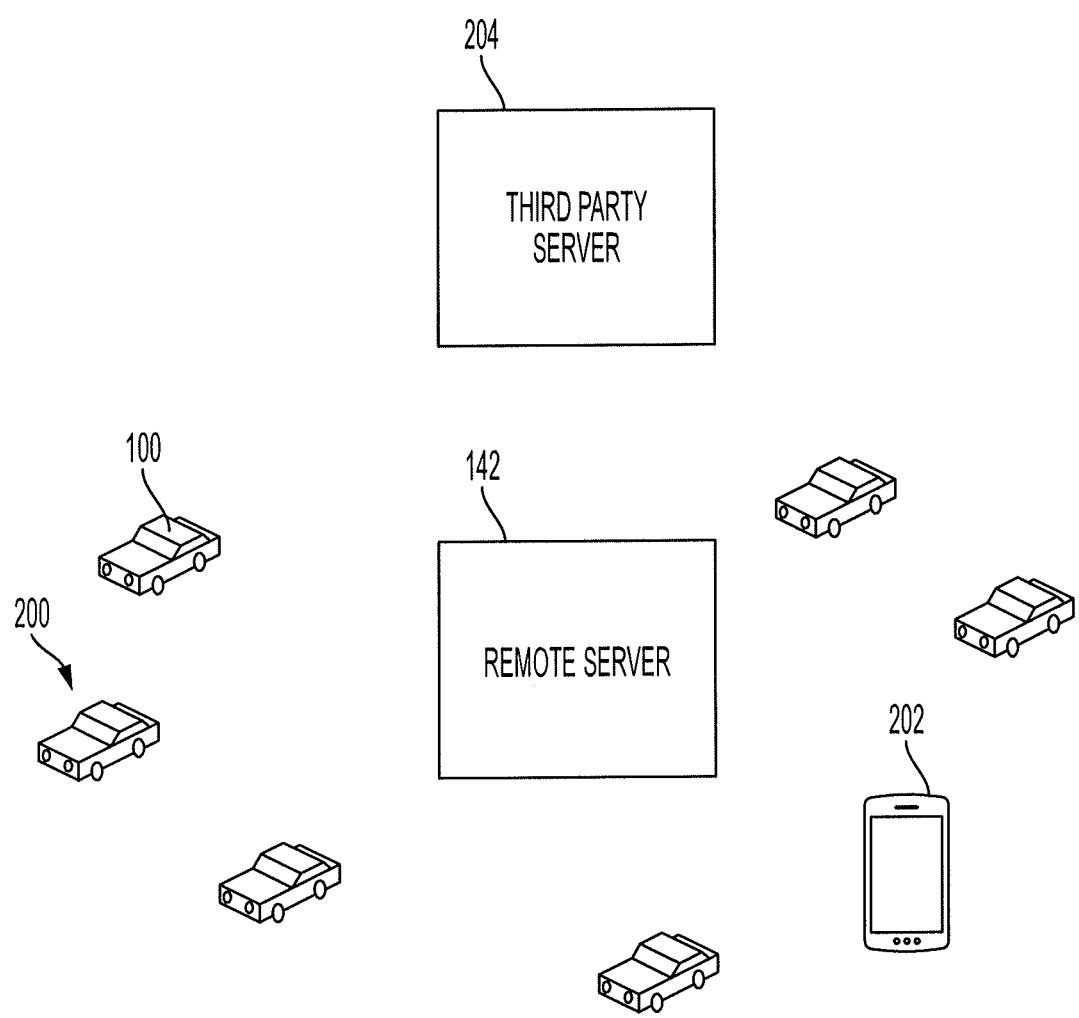
FIG. 2 is a block diagram illustrating a system for aggregating allergen information from multiple vehicles according to an embodiment of the present invention.

Referring now to FIG. 2, the remote server 142 may communicate with multiple vehicles 200 including the vehicle 100. The remote server 142 may receive allergen data (including exhaust data) from some or all of the vehicles 200. The remote server 142 may aggregate the allergen data to identify levels of a single allergen (e.g., a level 5 out of 10 for maple tree pollen), levels of multiple allergens (e.g., a level 8 out of 10 for maple tree pollen, a level 2 out of 10 for grass pollen, and a level 5 out of 10 for vehicle exhaust pollution), or a single level corresponding to multiple allergens (e.g., a level 6 out of 10 for all allergens in an area).

The remote server 142 may further analyze the allergen data to determine trends in the data. The remote server 142 may further predict future allergen levels (of a single allergen, of multiple allergens, or a general allergen level) at various locations based on the determined trends. In that regard, the remote server 142 may perform an artificial intelligence (e.g., machine learning) algorithm, other optimization algorithm, or any other algorithm capable of determining such trends.

The remote server 142 may further communicate with a third-party server 204. The third-party server 204 may provide public information data such as weather data (wind speed, temperatures, or the like). The remote server 142 may receive this public information data and may use the public information data to aid in the prediction of the future allergen levels. For example, if allergens are at a level 6 out of 10 in a first area and a 2 out of 10 in a second area directly north of the first area, and the wind is blowing in a northern direction, then the remote server 142 may predict that the second area may soon have an allergen level of 6 out of 10.

The remote server 142 may further predict how long in the future the allergen levels in the second area will increase based on a distance from the first area to the second area and based on the wind speed.

The remote server 142 may generate an allergen map corresponding to allergen levels at various locations. The allergen map may include one or more map or other data structure mapping allergen levels to the locations. The allergen map(s) may correspond to at least one of current allergen levels at the locations or future allergen levels at the locations. The remote server 142 may transmit the allergen map (which for purposes of this disclosure may include any other data structure mapping allergen levels to locations) to some or all of the vehicles 200. The remote server 142 may further transmit the allergen map to one or more mobile device 202. The mobile device 202 may include any mobile device such as a cell phone, a laptop, a tablet, or the like. The mobile device 202 may include an application to receive and display the allergen map, and may be associated with a user of one of the vehicles 200, or may be unassociated with a vehicle. The vehicles 200 and the mobile device 202 may display or otherwise output the allergen map (or the data contained therein) and may take another action as discussed elsewhere herein.

Figure 3:
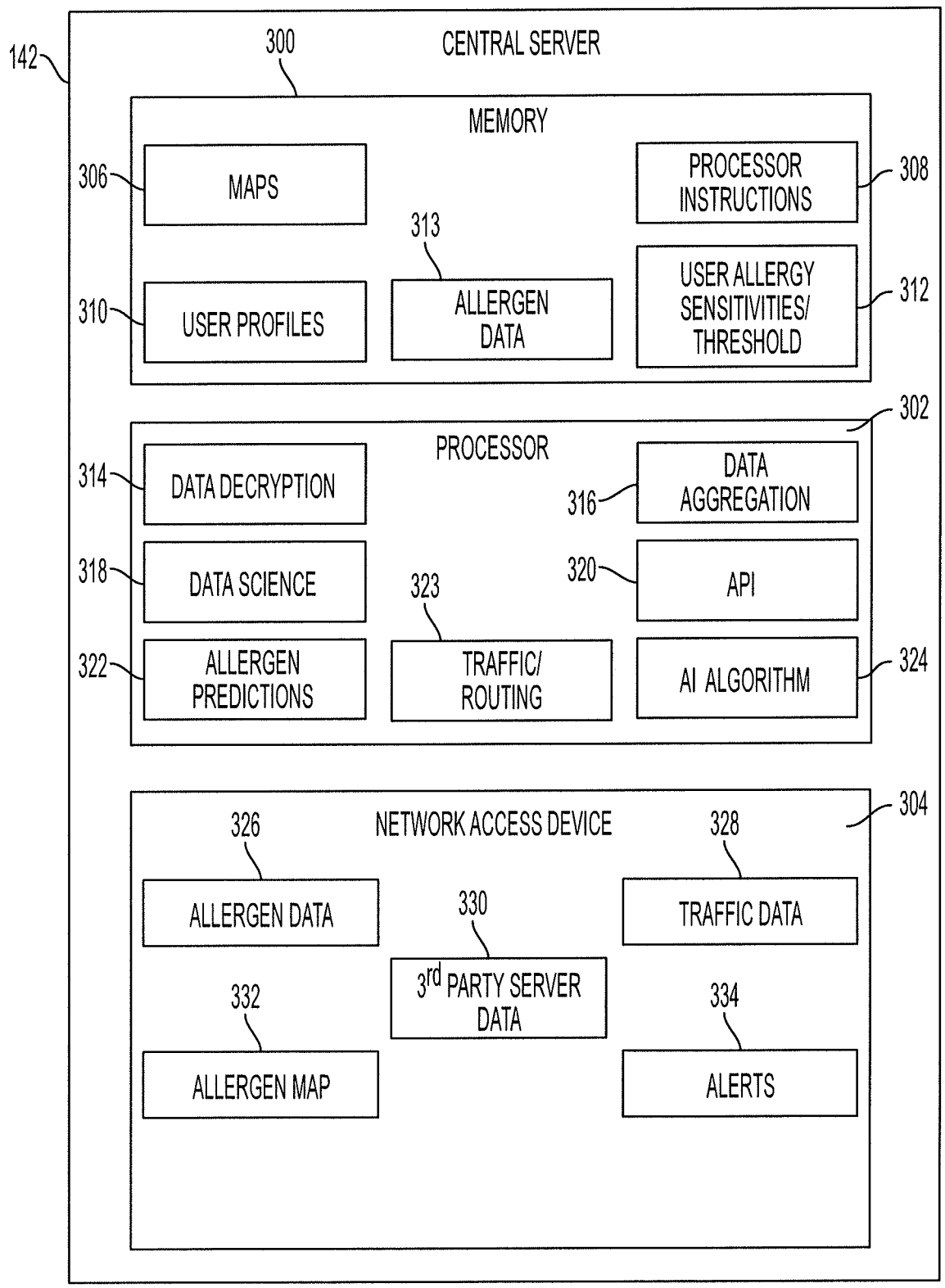
FIG. 3 is a block diagram illustrating features of a server of the system of FIG. 2 according to an embodiment of the present invention.

Referring now to FIG. 3, additional details of the remote server 142 are shown. As shown, the remote server 142 includes a non-transitory memory 300, a processor 302, and a network access device 304. The memory may include any non-transitory memory capable of storing data. The processor 302 may include any controller, processor, or other discrete logic device capable of performing logic functions. In some embodiments, the processor 302 may be an artificial intelligence processor capable of performing artificial intelligence algorithms. The network access device 304 may include any network access device capable of communicating with remote devices (such as one or more of the vehicles 200 or mobile device 202 of FIG. 2). For example, the network access device 304 may communicate via Bluetooth, Wi-Fi, a cellular protocol, vehicle to vehicle (V2V) communications, Zigbee, or any other wired or wireless protocol.

The memory 300 may store at least one of information requested by the processor, information programmed into the memory 300 by a manufacturer or service provider, or instructions usable by the processor 302 to perform an algorithm. In particular, the memory 300 may store maps 306. The maps 306 may include various locations as well as identifiers of the locations. For example, the maps 306 may distinguish between areas by neighborhoods, streets, intersections, GPS coordinates, or the like. In some embodiments, the maps 306 may also or instead include points of interest (POI) and corresponding addresses. The maps 306 may further include allergen information (such as allergen levels) for some or all of the areas covered by the maps 306. The maps may include any data structure that distinguishes between locations.

The memory 300 may further store processor instructions 308. The processor instructions 308 may include instructions usable by the processor 302 to perform one or more algorithm (such as one or more of the algorithms described below). In some embodiments, the processor 302 may be an application-specific integrated circuit (ASIC) or other processor in which the algorithms are hard-coded into the processor 302. In such embodiments, the processor instructions 308 may be stored in the processor 302.

The memory 300 may further store user profiles 310. The user profiles 310 may include information corresponding to users of the system in which the remote server 142 provides allergen information. For example, the user profiles 310 may include usernames and passwords that allow authorized users to access or receive data from the remote server 142. The user profiles 310 may further include user preferences such as whether or not to output a warning if allergen levels reach or exceed a threshold level, whether or not to provide routes that avoid allergen levels that reach or exceed the threshold level, or the like.

The memory 300 may further store user allergy sensitivities or allergen threshold levels 312. The user allergy sensitivities or allergen threshold levels 312 may include user-specific allergen sensitivities, which may or may not be parsed into separate allergen sensitivities for one or more specific allergen. In some embodiments, the user allergy sensitivities or allergen threshold levels 312 may be included in the user profiles 310. For example, the user allergy sensitivities or allergen threshold levels 312 may indicate that User A is sensitive to maple tree pollen at or above a 6 out of 10 and to grass pollen at a level at or above 4 out of 10, and lacks sensitivity to any other allergens.

In some embodiments, the user profiles 310 and the user allergy sensitivities or allergen threshold levels 312 may be stored in the memory 104 of the vehicle 100 of FIG. 1, or in a memory of the mobile device 202 of FIG. 2. In some embodiments, multiple user profiles 310 and user allergy sensitivities or allergen threshold levels 312 may be stored in one or more of the vehicles 200 of FIG. 2; each of the profiles 310 or threshold levels 312 may correspond to a separate user.

The memory 300 may also store allergen data 313, such as historical allergen data. The allergen data 313 may be received by the network access device 304 and stored in the memory 300 for later processing or analysis by the processor 302.

The processor 302 may be designed to perform various functions or algorithms. For example, the processor 302 may be designed to perform a data decryption algorithm 314. In some embodiments, the allergen data from vehicles may be encrypted prior to transmission to the remote server 142. Such encryption may reduce the likelihood of a data breach of data from the vehicle. In these embodiments, the data decryption algorithm 314 may decrypt the encrypted allergen data, rendering the data usable for analysis and aggregation.

In some embodiments, the allergen data may be packaged together with other data from the vehicle, such as image data from cameras, acceleration and braking data, or the like. In such embodiments, the data decryption algorithm 314 may decrypt some or all of the data received from the vehicle and may isolate or separate the allergen data.

The processor 302 may be further designed to perform a data aggregation algorithm 316. The data aggregation algorithm 316 may be designed to aggregate allergen data from multiple vehicles. The allergen data may include allergen levels of one or more allergen as well as associated locations in which the allergen levels were detected. This aggregation may give a partial or full picture of allergen levels at various locations.

The processor 302 may also be designed to perform a data science algorithm 318. The data science algorithm 318 may analyze or otherwise review or interpret the allergen data from the multiple vehicles and may place the aggregated allergen data in a usable format. For example, the data science algorithm 318 may analyze the allergen data to determine average allergen levels at multiple locations based on the aggregated allergen data. The data science algorithm 318 may further create an allergen map. The allergen map may take any of a variety of formats such as a database that links allergen levels to associated locations, a map that shows average allergen levels at various locations, or the like.

The processor 302 may be further designed to perform an application programming interface (API) algorithm 320. The API algorithm 320 may facilitate communication between the remote server 142 and the vehicles 200, mobile device 202, or third-party server 204 of FIG. 2. For example, the API algorithm 320 may convert allergen data, or a determined allergen map, from a format in which the processor 302 may analyze or otherwise access or manipulate the data. The API algorithm 320 may convert the data into a format that makes sense to a human reading the allergen data or the allergen map.

The processor 302 may also perform an allergen prediction algorithm 322. The allergen prediction algorithm 322 may predict levels of one or more allergen in one or more location. For example, the allergen prediction algorithm 322 may predict that tree pollen will rise from a 2 out of 10 to a 5 out of 10 at a first location over 16 hours. As another example, the allergen prediction algorithm 322 may predict that maple tree pollen in a second location will rise from a 4 out of 10 to a 6 out of 10 over 37 minutes, and that grass pollen in the second location will decrease from a 5 out of 10 to a 2 out of 10 over 90 minutes.

The allergen prediction algorithm 322 may make predictions based on various information. For example, the allergen prediction algorithm 322 may make predictions based on the allergen data received from one or more vehicles. The allergen prediction algorithm 322 may also or instead make predictions based on the allergen map generated by the data science algorithm 318. The allergen prediction algorithm 322 may also or instead make predictions based on third-party server data (such as third-party server data 330 received by the network access device 304). The third-party server data 330 may include weather information including current and predicted weather in one or more location, additional allergen information received from third parties, or the like.

The processor 302 may further perform a traffic and/or routing algorithm 323. The traffic/routing algorithm may analyze data received by the network access device 304 to determine traffic conditions at locations in the maps 306. For example, the traffic conditions may be determined based on a quantity of vehicles in an area, a speed of the vehicles in the area, an amount of time it takes vehicles to travel between two or more locations, a status of stop lights in an area, or the like.

The traffic/routing algorithm 323 may further determine routes for vehicles to take. For example, the traffic/routing algorithm 323 may determine routes between two or more locations on the maps 306. The traffic/routing algorithm 323 may determine the routes based on various information such as traffic in the region, distances between locations, location of various allergens in the region, or the like.

The processor 302 may also perform an artificial intelligence algorithm 324. The artificial intelligence algorithm 324 may be performed in some, all, or none of the other algorithms performed by the processor 302. The artificial intelligence algorithm 324 may include a machine learning algorithm and may be trained using previously-detected, received, or otherwise obtained data, based on currently received or detected data, or the like. In some embodiments, the processor may perform another optimization algorithm instead of, or along with, the artificial intelligence algorithm.

The artificial intelligence algorithm 324 (or any other optimization algorithm) may, for example, monitor the predictions made by the allergen prediction algorithm 322 and may adjust the allergen prediction algorithm 322 to increase accuracy of the predictions.

The network access device 304 may transmit and/or receive data from vehicles, from remote devices (such as mobile telephones, laptops, or tablets), or the like. For example, the network access device 304 may receive allergen data 326 from vehicles or other sensors.

The network access device 304 may further receive traffic data 328. The traffic data 328 may include current or predicted traffic at various locations, and the processor 302 may transmit the traffic data 328 to vehicles or may use the traffic data 328 when determining routes for vehicles to travel. For example, the processor 302 may use the traffic data 328 and the allergen map to determine a route for a vehicle to travel that avoids heavy traffic as well as avoids locations with high allergen levels.

The network access device 304 may also receive third-party server data 330. The third-party server data 330 may be received from a third-party server and may include information such as weather data, allergen levels determined or received from third parties, or the like.

The network access device 304 may transmit an allergen map 332, such as an allergen map 332 determined by the data science algorithm 318. The allergen map 332 may be transmitted to a vehicle, to a mobile device, or the like.

The network access device 304 may further transmit alerts 334. For example, a user may request to be notified when he is entering an area with pollen levels above a threshold level. If the user enters such an area, the processor 302 may generate an alert to be sent to a vehicle or mobile device of the user, and the network access device 304 may transmit the alerts 334 to the vehicle or mobile device.

Figure 4A:
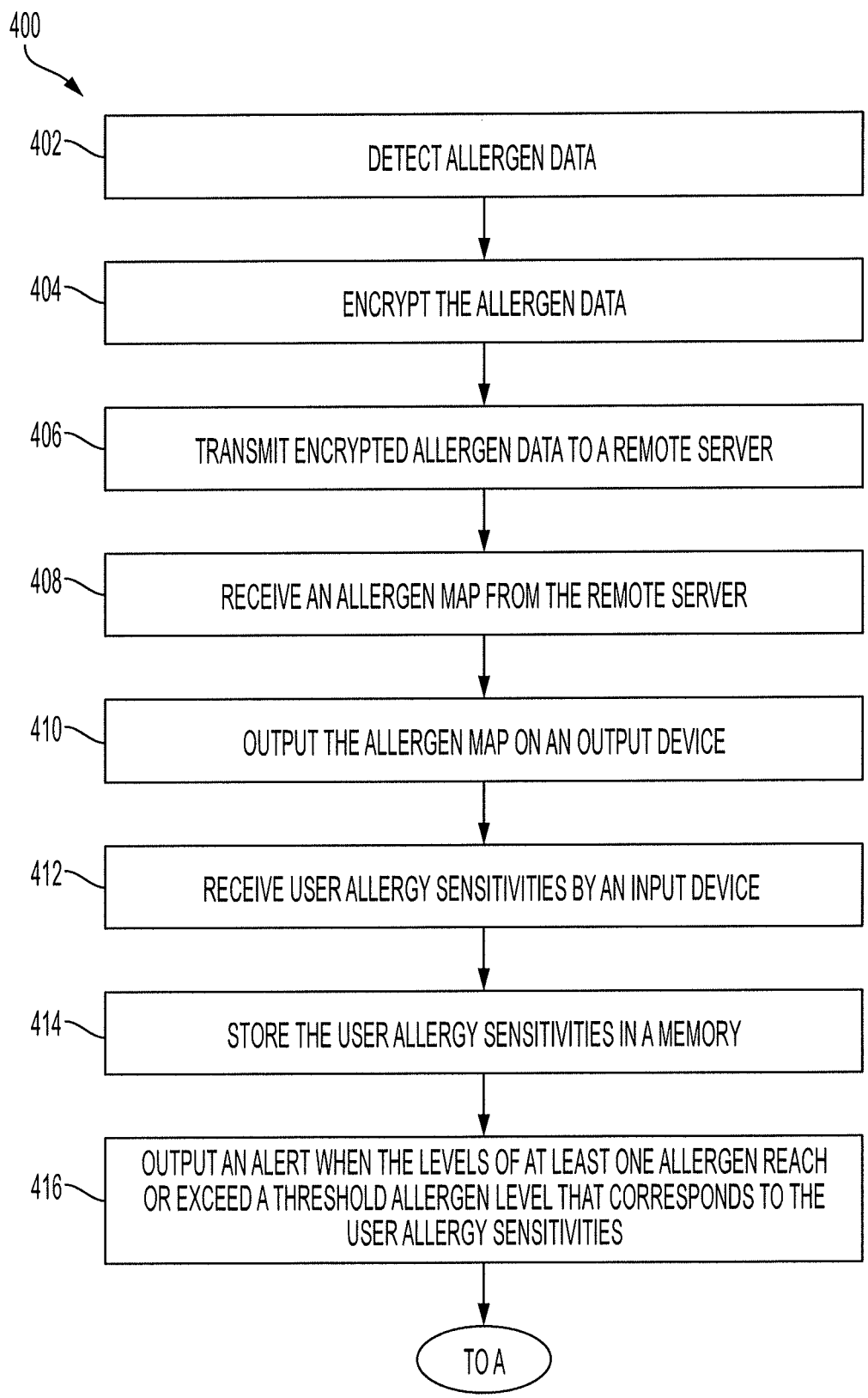
FIGS. 4A and 4B are flowcharts illustrating a method for providing allergen information to a server and taking actions based on specific allergen levels by a vehicle according to an embodiment of the present invention.
Figure 4B:
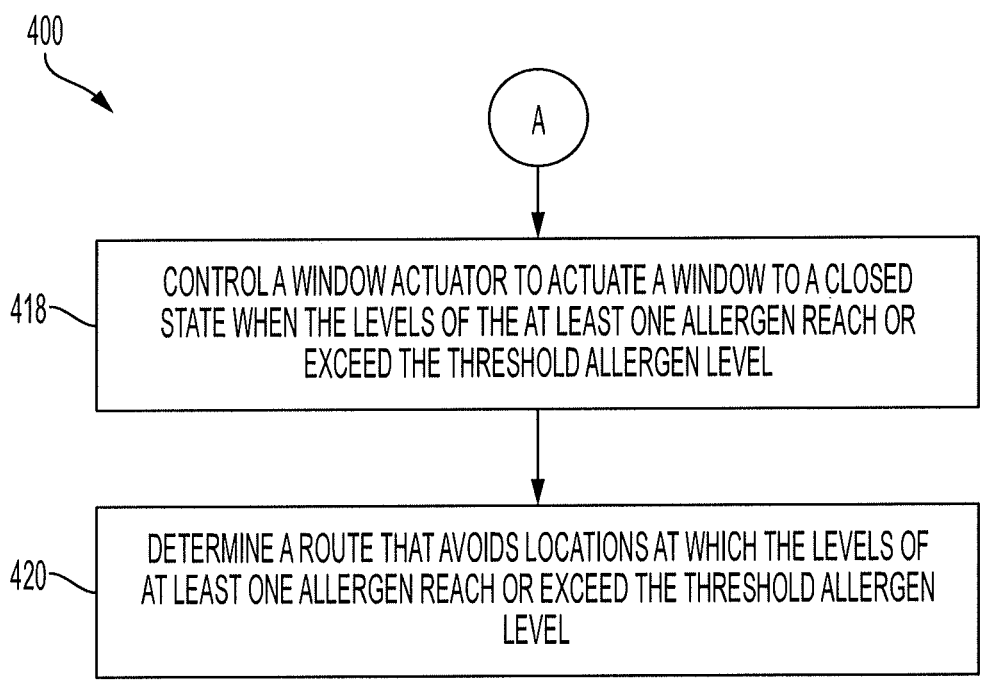

Turning now to FIGS. 4A and 4B, a method 400 may be performed by a vehicle, such as the vehicle 100 of FIG. 1, to provide allergen data. The method 400 may begin in block 402 in which an allergen sensor of the vehicle may detect allergen data. The allergen data, as mentioned above, may include a total level of allergens in the vicinity of the vehicle, levels of specific allergens, or the like. The allergens may correspond to natural allergens (such as pollens) or to other allergens (such as exhaust). In some embodiments, the ECU may calculate or otherwise determine exhaust generated by the vehicle and provide this exhaust data as allergen data.

In block 404, the vehicle (such as an ECU) may encrypt the allergen data. The encryption may protect the data against a breach. For example, the allergen data may be transmitted along with other, more sensitive, vehicle information to a central server. The data encryption may protect the allergen data and the more sensitive information together.

In block 406, a network access device of the vehicle may transmit the allergen data to a remote server. The remote server may take the allergen data, analyze or otherwise aggregate the allergen data, and generate an allergen map.

In block 408, the vehicle may receive the allergen map from the remote server. The allergen map may have any format such as a representation of a map with allergen levels provided at various street locations, may include a spreadsheet with allergen levels at associated road intersections, or may include any other data structure.

In block 410, the ECU of the vehicle may control an output device to output the allergen map, or the data contained therein, to convey the information to a user. For example, a touchscreen or other display of the vehicle may display a map with color-coded allergen levels at various locations. For example, the display may show a map with some areas highlighted in red to indicate relatively high allergen levels. As another example, the display may show a map with some areas highlighted in green to represent high grass pollen areas and some areas highlighted in orange to represent high maple tree pollen areas. As another example, the display may output only a warning if the vehicle is entering an area with relatively high pollen levels.

In block 412, an input device of the vehicle may receive user allergy sensitivities. The user allergy sensitivities, as described above, may represent user-specific sensitivities to allergens in general or to specific allergens. The input device may include a button, touchscreen, or the like, or may include a network access device that receives the user allergy sensitivities.

In block 414, the ECU of the vehicle may control a memory to store the user allergy sensitivities. The memory may be a local memory on the vehicle or may be a remote memory, such as on a server.

The ECU of the vehicle (or a processor of a remote server) may monitor the location of the vehicle (or location of a mobile device associated with a user) as well as the allergen map to determine pollen levels at locations of the vehicle (or mobile device). If the vehicle (or mobile device) is in, or entering, an area in which pollen levels reach or exceed levels associated with the user allergy sensitivities then the ECU of the vehicle (or processor of the server) may output an alert in block 416. The alert may be generated when the levels of at least one allergen reach or exceed a threshold allergen level that corresponds to the user allergy sensitivities.

In some embodiments, the ECU (or processor) may determine a route of the user and may generate an alert when the route takes the vehicle through (or the destination is associated with) an area that has allergen levels that reach or exceed the threshold allergen level(s). In some embodiments, the ECU (or processor) may generate an alert when the route takes the vehicle through (or the destination is associated with) an area that has predicted allergen levels that will reach or exceed the threshold allergen level(s) at a time that the route will be taking the vehicle (or mobile device) through the area. In that regard, block 416 may be based on the allergen map, the predicted allergen levels, a predicted or known route of the vehicle (or mobile device), or the like.

The ECU may take additional actions to reduce exposure of a driver or passenger to allergens based on at least one of the allergen map or the predicted allergen levels. For example, in block 418, the ECU may control a window actuator of the vehicle to close a window when the levels of at least one allergen reach or exceed a threshold allergen level. The threshold allergen level may be predetermined by the automobile manufacturer, may be provided by a user (such as in a user allergy sensitivities), or the like. In some embodiments, the ECU may close the window prior to the vehicle reaching the area with the levels of allergens that reach or exceed the threshold allergen level to further reduce the likelihood of the allergen reaching the vehicle cabin. In some embodiments, the ECU may close the window prior to the vehicle reaching an area with predicted allergen levels that reach or exceed the threshold allergen level.

In block 420, the ECU (or processor of the server) may determine or predict a destination of a driver or passenger and may determine a route based on the allergen map. For example, the ECU may predict a destination and may determine a route to the destination that avoids areas with allergen levels (or predicted allergen levels) that reach or exceed the threshold allergen level. The ECU may determine the route based on additional information such as traffic along routes, energy usage along routes, or the like.

Figure 5:
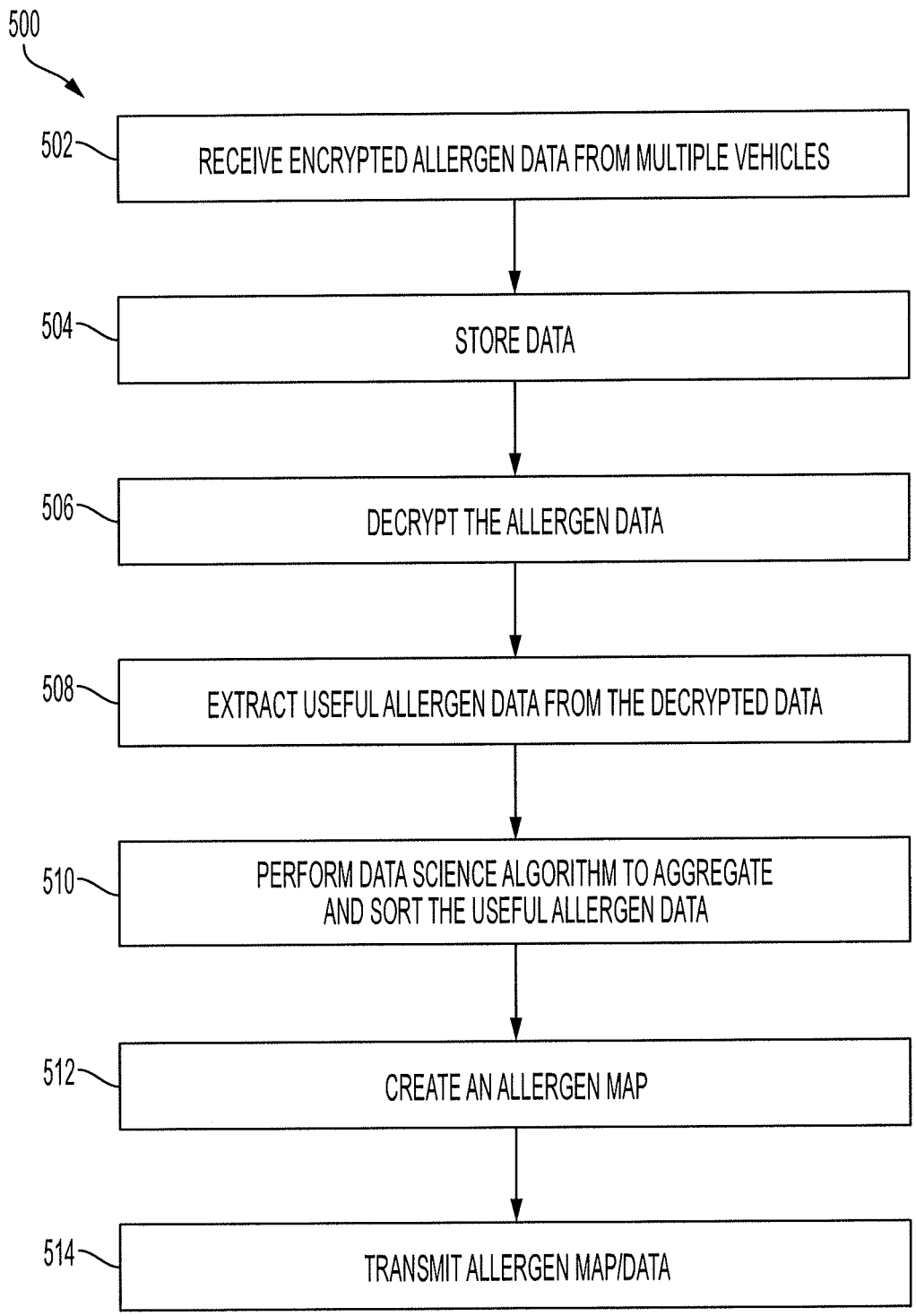
FIG. 5 is a flowchart illustrating a method for generating an allergen map by a server according to an embodiment of the present invention.

Referring to FIG. 5, a method 500 may be performed by a server to determine allergen information. The method 500 may begin in block 502 where the server may receive allergen data, potentially with other data, from multiple vehicles. The allergen data may be received from allergen sensors that detect information such levels of allergens present in an environment of the vehicle, levels of allergens (such as pollution) generated by the vehicle (e.g., detected in an exhaust of the vehicle), or the like.

In some embodiments, the data in block 502 may include other data such as location data (e.g., a latitude and longitude of the vehicle when the allergen data was detected). The data may further include a timestamp corresponding to the time at which the allergen data was received. In some embodiments, the data in block 502 may be received from time to time, or periodically. For example, the data may be received from each vehicle every 30 seconds, 1 minute, 2 minutes, or the like.

In block 504, a memory of the server may store data. The data may include a map, the allergen data from block 502, or the like. The map may be programmed into the server during initial installation of the server, may be provide to the server via an update, may be accessed by the server (such as via a commercially-available map), or the like.

In block 506, a processor of the server may decrypt the allergen data. The allergen data may be received by the server as allergen data alone, or may be received with other non-allergen data (such as other data detected by sensors of the vehicle). In embodiments in which the allergen data is received with other data, the processor may separate the allergen data from the other data after decryption.

In block 508, the processor may extract useful information from the allergen data. For example, the processor may extract the allergen data (and potentially location data and/or time data corresponding to the allergen data) from other data received from the vehicles. The processor may further select allergen data with higher priority levels than other allergen data of a lower priority and extract the allergen data with the higher priority levels instead of, or before, the allergen data with the higher priority. The higher priority levels may be associated with a trusted vehicle, a trusted brand of sensors, or the like.

The processor may use the higher priority allergen data at first to determine general allergen levels and then later may supplement the higher priority data with lower priority data. The processor may identify certain vehicles as providing higher quality, or more accurate, data and may assign data from those vehicles as having a higher priority. In some embodiments, the processor may treat all allergy data as having the same priority. If allergen data from different vehicles provides different values then the processor may either select the highest priority data as being accurate, may take an average of all allergen data, or may use any other method of correcting such disparities.

In block 510, the processor may perform a data science algorithm to aggregate and sort the useful allergen data. The data science algorithm may change the allergen data from a raw data format into relative allergen levels, such as "5 out of 10." The data science algorithm may further parse the allergen data into separate locations. For example, the data science algorithm may separate the allergen data from raw data into allergen levels at each of multiple previously-determined locations. In some embodiments, the data science algorithm may determine or parse locations, such as based on location data included with the allergen data. For example, if allergen data is received for a first location and a second location, then the data science algorithm may determine two locations in which to provide allergen data based on the first location and the second location. The data science algorithm may assign equal sizes to the first location and the second location (with a dividing line spaced equally between the first location and the second location), or may select sizes of the locations based on the allergen data and the associated locations.

The data science algorithm may aggregate and sort the useful allergen data (potentially along with the location of the vehicle and/or the time/date data) to determine allergen levels at locations at which vehicles have recently been located and during times at which the allergen levels were detected. If allergen levels are known for two locations but not a third location between the two locations then the processor may take an average of the allergen levels at the two locations and use the average as a predicted or determined allergen level at the third location.

The processor may continue to add, update, or change allergen levels at various locations based on newly-received allergen data. For example, if the allergen level at a first location is a 4 out of 10 based on a first piece of allergen data and a second piece of allergen data indicates that the allergen level is a 6 out of 10, then the processor may determine that the allergen data is a 5 out of 10. In some embodiments, the processor may determine that the allergen level is a 6 out of 10 based on an assumption that the first piece of allergen data is no longer accurate due to changing conditions. In some embodiments, the processor may assign a higher priority to newer allergen data and assign a lower priority to older allergen data as time elapses. The older allergen data may continuously decline in priority until the assigned priority is 0 and the old data is discarded (or ignored).

In block 512, the processor may create an allergen map. The allergen map may be created based on the map stored in the memory and based on the allergen data (including one or both of the usable allergen data from block 512 or the raw allergen data). The allergen map may be provided as a representative map (e.g., allergen levels may be overlaid onto a physical map). As another example, the data may be provided in a data format that includes allergen levels with associated locations (e.g., a spreadsheet may be provided that provides allergen levels at intersections or neighborhoods). The allergen map may be provided in any format, and may be adjusted or re-formatted by the end device (e.g., a mobile device or a vehicle). For example, the allergen map may be provided as a spreadsheet, and an end device may reformat the data into allergen levels overlaid onto a map.

In block 514, the server may transmit the allergen map and/or the useful allergen data. For example, the server may transmit the map/data to vehicles to be output via an output device. The server may also or instead transmit the map/data to a mobile device associated with a user of the system for output on the mobile device. In some embodiments, the map/data may be transmitted via email, text, or another format such that the user may view the map/data on various devices.

Figure 6:
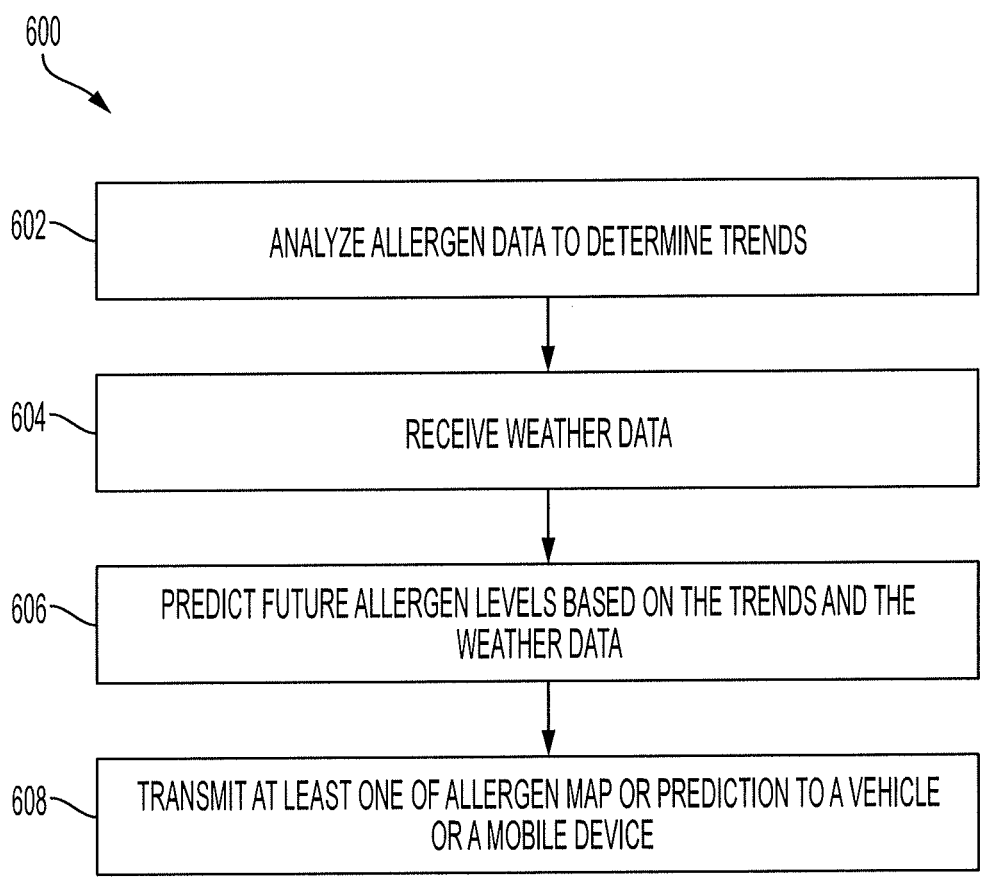
FIG. 6 is a flowchart illustrating a method for predicting allergen levels based on learned trends and current allergen information according to an embodiment of the present invention.

Referring now to FIG. 6, a method 600 may be performed by a server, such as the server 142 of FIG. 2, to predict future allergen levels. The method 600 may begin in block 602 where the server may analyze allergen data to determine trends. The server may analyze the raw allergen data, may analyze the allergen maps, may analyze the data generated by the data science algorithm, or the like.

The trends may correspond to changes in allergen levels, associations between various factors and allergen levels (such as increased winds decrease allergen levels by 10 percent on average), or the like. The server may determine trends associated with specific locations (e.g., an increase in temperature of 5 degrees Fahrenheit at a first location corresponds to a 10 percent increase in levels of maple tree pollen) or general trends (e.g., levels of grass pollen increase 5 percent during the first week of May). In some embodiments, the trends may be learned by an artificial intelligence algorithm and the trends or patterns may or may not be known to individuals operating the system.

In block 604, the server may receive weather data. The weather data may be received from a third-party server, from a public information service (such as a national weather station), or the like. The weather data may include any type of weather data (such as wind speeds, temperatures, forecasts, water temperatures, cloud cover, or the like). In some embodiments, the server may verify the weather data by comparing weather data from multiple sources. In some embodiments, the server may further receive other data which may affect allergen levels (such as traffic data which may affect exhaust levels).

In block 606, the server may predict future allergen levels based on the trends, the current allergen data, and other data (e.g., the data received in block 604). For example, the server may predict the allergen levels by applying the trends and other data to the current allergen data. For example, if the trends indicate that an increase in temperature of 5 degrees increases maple tree pollen by 10 percent, the current maple tree pollen level is a 5 out of 10, and the temperature is increasing by 5 degrees in 1 hour, then the server may predict a maple tree pollen level of 6 out of 10 in one hour.

In block 608, the server may transmit at least one of an allergen map with future allergen level predictions or the future allergen level predictions in a different format to a vehicle or mobile device. For example, the server may embed predictions into an allergen map and send the allergen map with the embedded predictions to the vehicle or mobile device. As another example, the server may transmit the predictions for one or multiple areas to one or more vehicle or mobile device.

Figure 7:
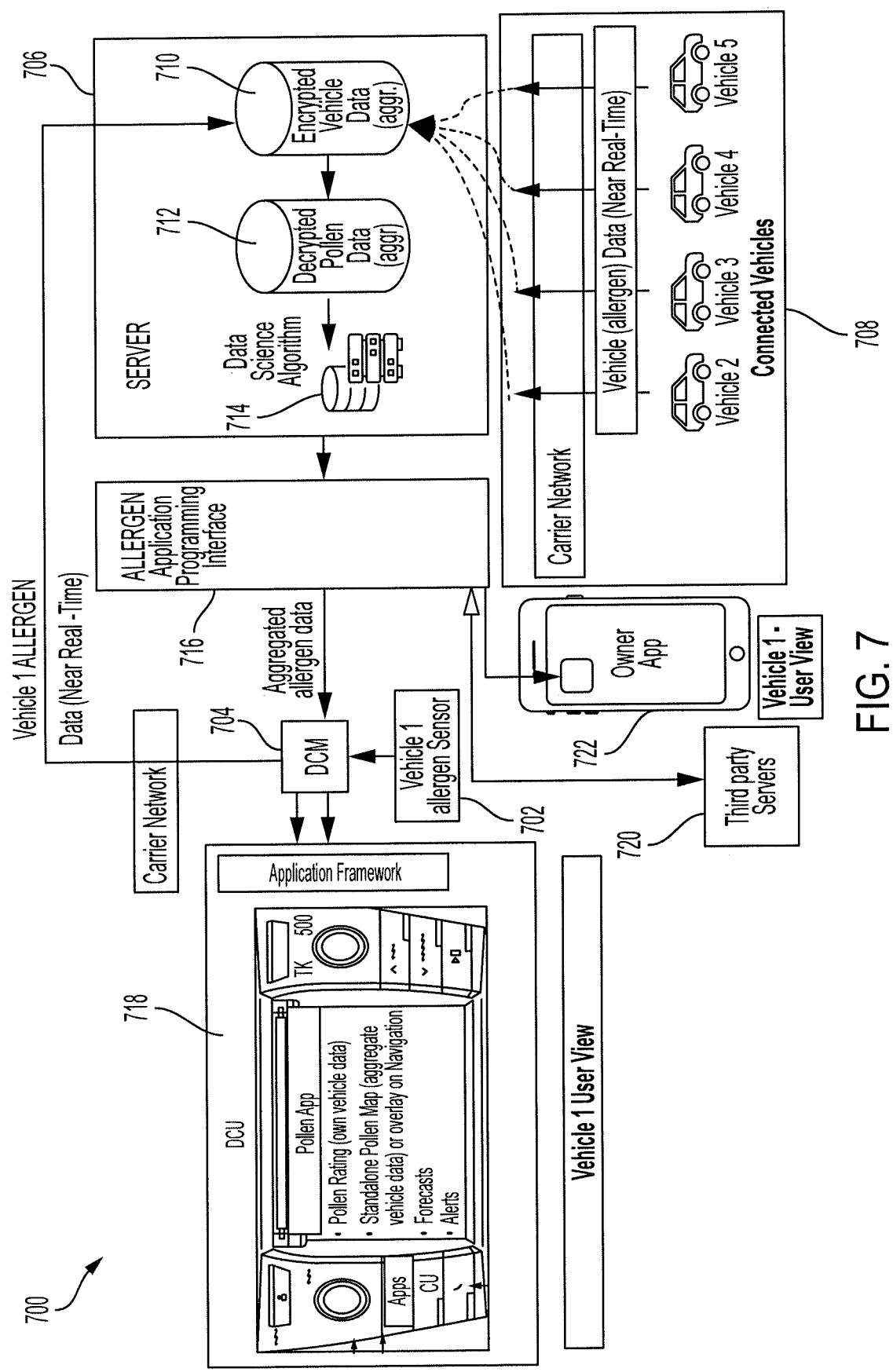
FIG. 7 is a block diagram illustrating an exemplary system for aggregating allergen data and generating an allergen map based on the aggregated allergen data according to an embodiment of the present invention.

Turning now to FIG. 7, an exemplary system 700 may implement methods similar to the methods 400 of FIGS. 4A and 4B and 500 of FIG. 5.

The system 700 may include a vehicle that has an allergen sensor 702, an output device 718, and a data communication module (DCM) 704. The allergen sensor 702 may detect allergen data corresponding to allergens in an environment of the vehicle, such as pollens, exhaust, or the like.

The DCM 704 may receive the allergen data from the allergen sensor 702 and may transmit the allergen data to a server 706. The allergen data may be transmitted in real-time or in near-real-time (e.g., within 30 seconds, 5 minutes, 10 minutes, or the like of the allergen data being detected). The server 706 may receive additional allergen data from additional vehicles 708 associated with the system 700.

The allergen data received by the server 706 may be encrypted, and the server 706 may include a database or memory 710 that stores the encrypted allergen data. The server 706 may decrypt the allergen data and store the decrypted data in another database or memory 712. In that regard, the memory 712 may store decrypted allergen data. The memories 710, 712 may be separate memories or the data from the memories 710, 712 may be stored in a same memory.

A data science algorithm 714 may analyze the data from one or both of the memories 710, 712. The data science algorithm 714 may convert the allergen data into a format which may be used by the server 706 to perform additional computations or into a format that is interpretable by a user. For example, the data science algorithm 714 may generate an allergen map.

An allergen application programming interface (API) 716 may facilitate communication between the server 706 and the present vehicle and/or the vehicles 708, and/or between the server 706 and a third-party server 720. The API 716 may be located on the server 706 or on another server or device.

The allergen map may be received by the DCM 704 of the vehicle via the API 716. The DCM 704 may transmit the allergen map to the output device 718. Exemplary data corresponding to the allergen map is shown in the output device 718.

The allergen data or allergen map may be transmitted to the third-party server 720. For example, the data may be sold to a third-party and may be received by the third-party server 720. The third-party server 720 may further transmit data, such as weather data or other allergen data, to the server 706.

The allergen data or allergen map may be further transmitted to a mobile device 722 associated with a user. For example, a user of the mobile device 722 may pay a subscription fee to receive the allergen data or allergen map. As another example, the mobile device 722 may be associated with the present vehicle and may receive the allergen data as a bonus feature of vehicle ownership. In some embodiments, the mobile device 722 may also include one or more allergen sensor, and may transmit the allergen data to the server 706. In some embodiments, a user of the mobile device 722 may use an input device to provide an estimate of allergen levels to the server 706, and the server 706 may further determine the allergen map based on the estimated allergen levels received from the mobile device 722.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for providing allergen information, the system comprising:
    an allergen sensor located on a vehicle and configured to detect allergen data corresponding to levels of at least one allergen in an environment of the vehicle; and
    an electronic control unit (ECU) coupled to the allergen sensor and configured to:
        transmit the allergen data to a remote server via a network access device,
        receive map data corresponding to an allergen map from the remote server via the network access device, the map data including allergen level information based on a prediction of future timing of an increase in the levels of the at least one allergen,
        identify at least one portion of the allergen map with an unknown level of the at least one allergen based on the received map data,
        predict a level of the at least one allergen of the identified at least one portion of the allergen map based on one or more known levels of the at least one allergen associated with one or more neighboring portions of the allergen map,
        generate an updated allergen map including the predicted level of the at least one allergen of the identified at least one portion of the allergen map,
        control an output device to output the updated allergen map,
        determine a route from a starting location to a destination, wherein the route avoids one or more locations in which the levels of the at least one allergen are predicted to be equal to or greater than a threshold allergen level when the vehicle is projected to drive through the one or more locations based on a current location of the vehicle and the updated allergen map, and
        maneuver the vehicle based on the determined route.

2. The system of claim 1, wherein:
    the allergen map is based on the allergen data from the vehicle and additional allergen data from additional vehicles, and indicates the levels of the at least one allergen at a plurality of locations of the allergen map;
    the allergen sensor includes at least one allergen sensor;
    the allergen data includes levels of a first allergen and of a second allergen; and
    the allergen map includes the levels of the first allergen and the levels of the second allergen at the plurality of locations of the allergen map.

3. The system of claim 2, further comprising a memory configured to store user allergy sensitivity data indicating that a user of the vehicle is sensitive to the first allergen and not the second allergen, wherein the ECU is further configured to control the output device to output an alert when the level of the first allergen reaches or exceeds the threshold allergen level at the current location of the vehicle and to remove the alert when the level of the first allergen drops below the threshold allergen level at the current location of the vehicle regardless of the levels of the second allergen.

4. The system of claim 1, further comprising a window and a window actuator configured to actuate the window from an open state to a closed state, wherein the ECU is further configured to determine a high allergen level event when a current allergen level of the at least one allergen in the environment of the vehicle is greater than or equal to the threshold allergen level and to control the window actuator to actuate the window to the closed state in response to the determination of the high allergen level event.

5. The system of claim 1, wherein the ECU is further configured to receive user input including user allergy sensitivity data via an input device, the user allergy sensitivity data indicating that a user of the vehicle is sensitive to the at least one allergen and including a level of user allergy sensitivities and to control the output device to output an alert when the levels of the at least one allergen reach or exceed the level of the user allergy sensitivities at the current location of the vehicle.

6. The system of claim 1, further comprising:
    a vehicle body defining a vehicle cabin in the vehicle;
    an air filter located in the vehicle and configured to filter air to be ported into the vehicle cabin; and an air intake channel configured to receive the air from the environment of the vehicle and to port the air to the air filter, wherein the allergen sensor is a pollen sensor configured to detect levels of pollen in the environment of the vehicle, and the pollen sensor is located at least one of in the air filter or in the air intake channel.

7. The system of claim 1, wherein the allergen sensor is configured to detect the at least one allergen in an exhaust on the vehicle, and the at least one allergen is an exhaust-related allergen.

8. The system of claim 1, wherein the ECU is further configured to encrypt the allergen data prior to the transmission of the allergen data to the remote server.

9. A system for providing allergen information, the system comprising:
- a memory configured to store data related to a map of an area; and
- a processor coupled to the memory and configured to:
  - receive allergen data and location data from a plurality of allergen sensors located on a plurality of respective vehicles via a network access device, the allergen data corresponding to levels of at least one allergen in a plurality of environments of the plurality of respective vehicles, the location data including a plurality of locations associated with the plurality of respective vehicles,
  - predict future timing of increase in the levels of the at least one allergen at an area of interest based on a distance between a reference area having known levels of the at least one allergen and the area of interest,
  - generate map data corresponding to an allergen map (i) associated with the area, (ii) indicating (a) the levels of the at least one allergen at the plurality of locations associated with the plurality of respective vehicles and (b) the levels of the at least one allergen at the area of interest based on the prediction of the future timing of the increase in the levels of the at least one allergen, and (iii) including at least one portion with an unknown level of the at least one allergen, and
  - transmit the map data to at least one vehicle via the network access device, the at least one vehicle including an electronic control unit (ECU) configured to identify the at least one portion of the allergen map with the unknown level of the at least one allergen, generate an updated allergen map according to a prediction of a level of the at least one allergen of the identified at least one portion of the allergen map based on one or more known levels of the at least one allergen associated with one or more neighboring portions of the allergen map, and maneuver the at least one vehicle based on the updated allergen map.

10. The system of claim 9, wherein the allergen data is encrypted prior to being received by the processor, and the processor is further configured to decrypt the allergen data prior to aggregating the allergen data.

11. The system of claim 9, wherein the processor is further configured to perform a data science algorithm configured to analyze the allergen data in order to place the allergen data into a usable data format.

12. The system of claim 9, wherein the processor is further configured to transmit the map data to a mobile device associated with a user of the system.

* * * * *